United States Patent [19]

Staar

[11] Patent Number: 4,791,411

[45] Date of Patent: Dec. 13, 1988

[54] MANUAL FREE-ACCESS VENDING MACHINE

[75] Inventor: Marcel J. H. Staar, Brussels, Belgium

[73] Assignee: Staar Development Co., S.A., Belgium

[21] Appl. No.: 63,950

[22] Filed: Jun. 19, 1987

[30] Foreign Application Priority Data

Jun. 20, 1986 [BE] Belgium ............................. 216.813

[51] Int. Cl.⁴ ...................... G08B 21/00; G08B 13/18
[52] U.S. Cl. ...................................... 340/568; 221/6;
221/17; 340/542; 340/585
[58] Field of Search ............... 340/568, 556, 585, 542;
221/2, 6, 7, 8, 17, 1

[56] References Cited

U.S. PATENT DOCUMENTS

| | | | |
|---|---|---|---|
| 3,828,340 | 8/1974 | Bauer, Jr. et al. | 340/542 |
| 3,905,530 | 9/1975 | Emmel | 221/155 |
| 4,566,285 | 1/1986 | Tershak et al. | 340/585 |
| 4,629,090 | 12/1986 | Harris et al. | 221/7 |

Primary Examiner—Glen R. Swann, III
Attorney, Agent, or Firm—Leydig, Voit & Mayer

[57] ABSTRACT

The status corresponding to the presence or absence of articles at their reserved locations is detected by means of an optical switch comprising an emitter which sends infra-red rays toward a receiver. The article obstructs these rays and hence its presence is detected. The information obtained from the optical switches is processed and used for servicing or billing.

21 Claims, 2 Drawing Sheets

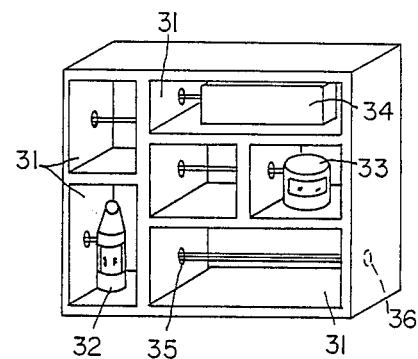
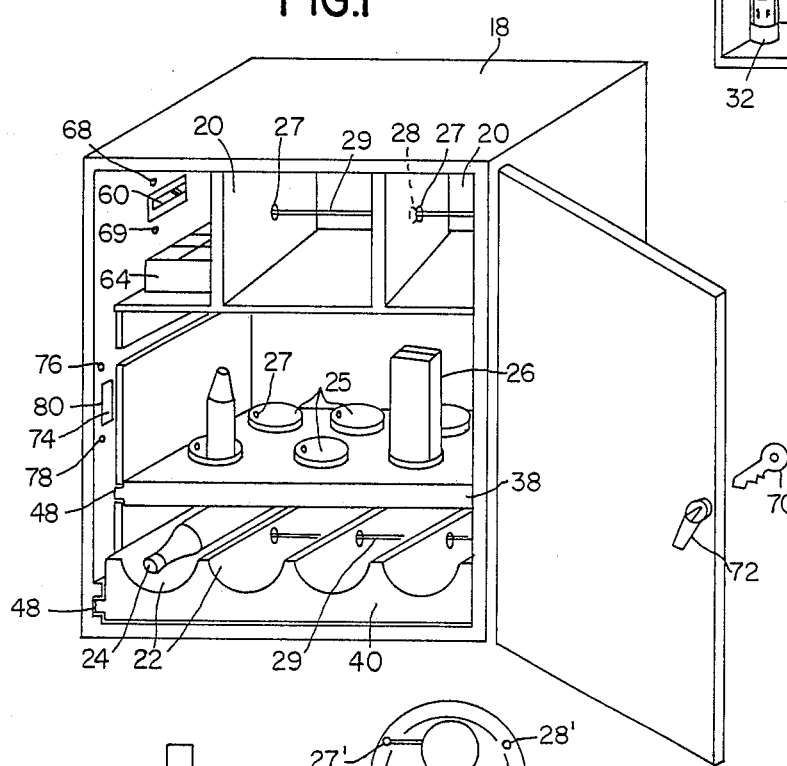
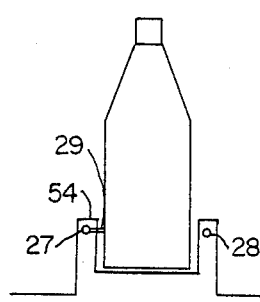
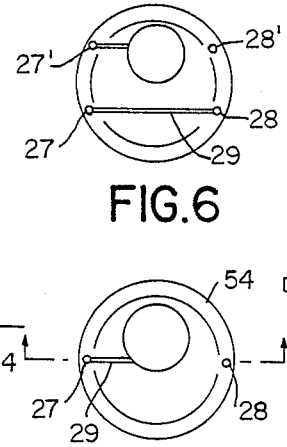
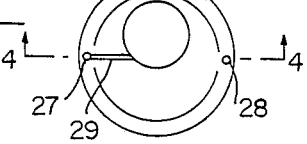
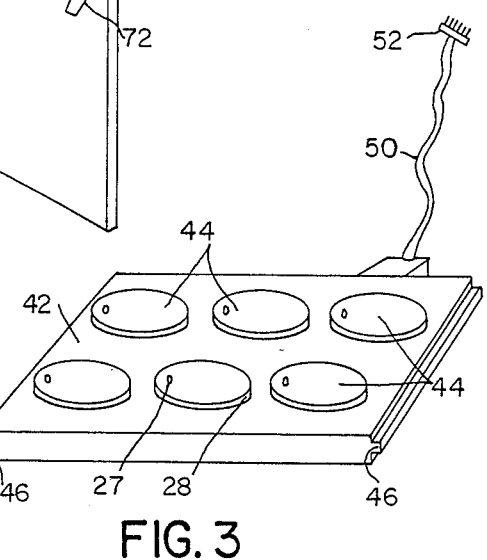

MANUAL FREE-ACCESS VENDING MACHINE

BACKGROUND OF THE INVENTION

Various types of automatic machines, semiautomatic machines or direct manual access machines for use in hotel rooms for vending articles such as bottles containing wine or liquor, snacks, or cosmetic articles, have been developed.

Some of these machines are very simple and comprise a small refrigerator. Hotel room occupants are able to take any article stored in the refrigerator and fill in a sheet so as to list the different purchases which are later added to their bill. The drawback with this type of machine is the inconvenience for the user in listing the different purchases and errors may easily occur.

Other machines are more automated. They permit a user to chose articles stocked in cells or a honeycomb, and when an article is removed, the corresponding cell closes, not permitting the repositioning of the article taken out, and the removal of the article is automatically recorded on a billing computer which records the purchase. This type of machine has the drawback that users cannot put back unused items if they change their minds after removing them from the machine.

SUMMARY OF THE INVENTION

The present invention has the objective of overcoming the above-mentioned drawbacks in conventional vending apparatus. It provides a manual free-access vending machine having means to detect the presence or absence of articles from their reserved locations and means operated by said detection means to identify the status at each of the locations for servicing or billing.

A further object of the present invention is to provide means in such a machine for automatically detecting the status corresponding to the presence or absence of an article in its reserved location.

Another object of the present invention is to provide such a machine with means which permits, at any moment, to identify the status at each of the locations for servicing or billing.

Another object of the present invention is to provide such a machine in which articles to be vended have fixed reserved locations.

Another object of the present invention is to provide such a machine with means to detect environmental conditions within the machine, such as the inside temperature of the refrigerator, the secure locking of the door, or the state of the electronic circuits.

BRIEF DESCRIPTION OF THE DRAWINGS

FIG. 1 represents a refrigerator in which fixed reserved locations are provided for different specific articles;

FIG. 2 shows an example of a non-refrigerated cabinet;

FIG. 3 shows a plate or shelf which has several article receptacles having recesses grouped on it;

FIG. 4 is a sectional view taken along the plane of lines 4—4 in FIG. 5;

FIG. 5 shows a plan view of a receptacle for a bottle of a rather large diameter as in FIG. 4 and has a detector in the form of an emitter/receiver;

FIG. 6 shows a plan view of a receptacle with two emitter/receiver sets which can be provided if it is desired to extend the range of sizes of articles that can be placed in a given receptacle;

DETAILED DESCRIPTION OF THE INVENTION

Figure 7:
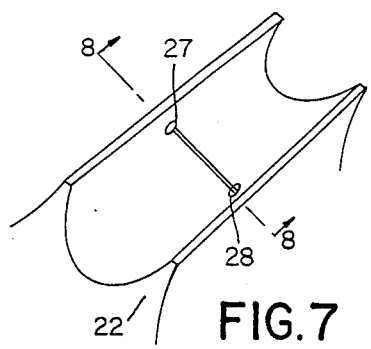
FIG. 7 shows an enlarged perspective view of a receptacle for receiving a bottle lying flat as shown in FIG. 1.

Referring to FIG. 1, a vending machine according to this invention comprises a cabinet 18 in which fixed reserved locations are provided for different specific articles. For example, locations 20 are reserved for packages of snacks, locations 22 are reserved for wine bottles 24, locations 25 are reserved for bottles or cartons 26. Refrigeration of at least a portion of the interior of the cabinet 18 is provided by conventional means. Each location is equipped with a detection means for detecting the status corresponding to the presence or absence of an article, herein shown as an optical switch comprising a set of an infra-red ray emitter 27 and a receiver 28. With the emitter 27 energized, the beam of infra-red rays 29 will reach the receiver 28, representing absence of an article, or will be interrupted by the presence of an article in its location.

FIG. 2 shows another embodiment of the present invention. It shows a non-refrigerated cabinet, for example, one used for vending cosmetic products. Locations 31 may receive flasks 32, jars 33, and boxes 34, and the detection means at ears location is an optical switch having emitter 35 and receiver 36.

In the embodiment shown in FIG. 1, shelves 38, 40 provide supports for the articles and are removable so as to be easily removed and replaced. A shelf 42, removed from a cabinet as shown in FIG. 3 has receptacles 44 grouped on it and guide flanges 46 slidable in grooves 48 provided in the cabinet side panels. The receptacles 44 are each equipped with an optical switch having a set of an emitter 27 and a receiver 28. The optical switches are preferably connected to the processing circuits by electric wires 50 and a plug 52 as shown in FIG. 3.

Referring to FIG. 4, each receptacle 44 comprises an upright flange 54 roughly corresponding to the outer shape of a designated article, which in this figure is a bottle, providing a recess in which the article rests and is secured or maintained from being accidentally shifted from its location. The article cuts the ray or beam 29 generated by the emitter 27 directed toward the receiver 28.

As is demonstrated in FIG. 5, the same location can be used for a bottle with a larger diameter as well as for a bottle with a smaller diameter, thus extending the range of sizes of articles that can be placed in a given location. If it is desired to extend this range still further, a second emitter/receiver set 27'-28' can be provided at the location as shown in FIG. 6 covering a field complementary to the other set of emitter and receiver, making it possible to detect the presence of bottles of a diameter nearly as large as the location itself, and also bottles of a diameter nearly one third the diameter of the location, the bottles interrupting at least one of the beams 29.

Figure 8:
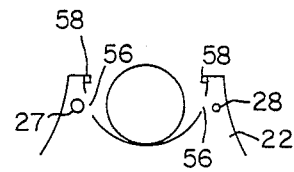
FIG. 8 is a sectional view along the plane of lines 8—8 in FIG. 7.

As disclosed in FIG. 8, the sets of emitters 27 and receivers 28 may be mounted in recesses behind the surface of a wall of a receptacle to avoid damage to the emitters 27 and the receivers 28 by direct bumps, scratches or by being covered by fragments of labels or glue coming from the stocked items. Openings 56 permit the beam of the emitter 27 to reach the receiver 28 in a given straight line path. Projections 58, in addition to or alternatively to the recessed mounting of the sets of emitter and receiver, contribute toward maintaining the bottles away from and avoiding damaging the emitter and receiver when the bottles are moved.

In another embodiment of the present invention, the optical switches can be used to detect other parameters, for example, environmental conditions within the interior of the cabinet to determine if the refrigerator is working or to determine if the refrigerator door is closed properly.

Figure 9:
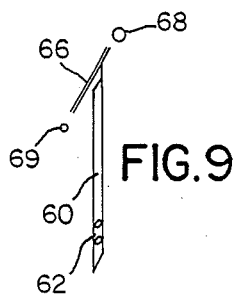
FIG. 9 shows a bimetallic blade to sense temperature.
Figure 10:
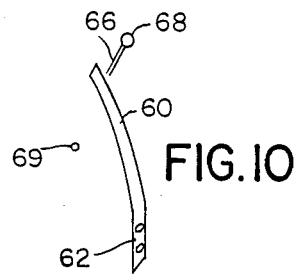
FIG. 10 shows the blade of FIG. 9 curved due to unequal contractions of the bimetallic structure at low temperature.

As shown in FIG. 9, and with reference to FIG. 1 a temperature detecting means in the form of a bimetallic blade 60 made of two metals of different temperature coefficients is secured at one end 62 to the inside wall of the area reserved to make the ice cubes 64 in the machine. The two metals comprising the blades are chosen so that at room temperature the blade is nearly straight and will not obstruct the rays 66 emitted by the emitter 68, thus activating the receiver 69, but when the blade is in cooler surroundings, the blade will curve due to the different contractions of the two metals and thus obstruct the rays 66, as shown in FIG. 10. The blade 60 in conjunction with the emitter 68 and the receiver 69 of the optical switch can be used to determine if the refrigerator is working properly or not.

For opening the cabinet of a machine constructed according to the present invention, the user might receive a key specifically reserved for the refrigerator, or the room key itself might open the refrigerator. As shown in FIG. 1, a key 70 is able to move a lever 72, which by turning enters an opening 74 to fully lock the door and obstructs the rays 80 from an emitter 76 to a receiver 78. When the refrigerator is correctly closed, the lever 72 cuts the rays 80 of the optical switch and thus information about correct closing of the refrigerator door can be obtained from the optical switch. If the door is not fully closed, the lever 72 may not enter the opening 74 and the rays 80 will not be obstructed, thus representing by the state of the switch that the door is not fully closed and locked.

Figure 11:
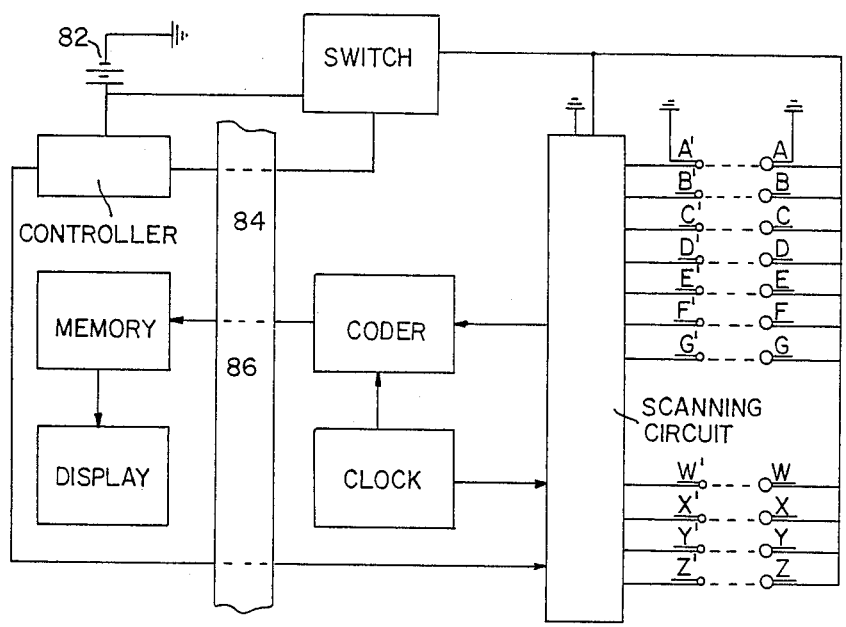
FIG. 11 is a schematic diagram of the vending machine and other related equipment for processing signals representing the various parameters obtained from the detection means of the vending apparatus.

FIG. 11 is a schematic diagram of an embodiment of the vending machine or apparatus and other related equipment for detecting and analysing signals representing various parameters obtained from the detection means of the vending apparatus.

A direct current power supply 82 feeds a series of infra-red emitters A-B-C-D-E-F-G placed in various locations in the cabinet 18. The corresponding receivers A'-B'-C'-D'-E'-F'-G' are connected to an integrated scanning circuit CI. When information about certain parameters in the refrigerator is required, an initiation signal is sent by the controlling circuit or controller I to switching circuit A through a wire 84. The switching circuit A permits the energizing of the emitters by the direct current power supply 82. At the same time the controller I initiates the scanning circuit CI which, controlled by a clock H, analyzes one by one, in sequence, the state of the receivers A'-B'-C'-D'-E'-F'-G'. The scanning circuit CI sends information about the state of the receivers to a coding circuit or coder C which in turn sends coded information, corresponding to an identification number of a location and the status of the location depending on whether the infra-red beam has been obstructed or not, to a storage circuit OM through a wire 86. The storage circuit OM stores the information in memory and/or sends it to visual means or display VE comprising either a display screen or a printer. When the scanning circuit CI reaches the end of its analysis, the switch A cuts off the power supply to the emitters.

The information about the presence or absence of items, for example, in a non-refrigerated cabinet, installed in the same room, may be detected and handled by the same circuits using the corresponding optical switches WW', XX', YY', ZZ' placed at locations inside the cabinet.

In case of detection of articles by two emitters and two receivers as disclosed in FIG. 6, the scanning circuit CI reads the status of the two optical switches, one after the other, so as to determine if at least one of the two beams is interrupted.

I claim:

1. A manual free-access vending machine allowing unconstrained direct access to a plurality of different outer shaped articles, said vending machine comprising:
   a housing;
   support means provided in said housing and defining fixed reserved locations from which corresponding individual articles can be removed and replaced;
   detection means disposed at each of said reserved locations to detect statuses corresponding to the presence or absence of each of said individual articles in said reserved locations and to generate signals representative thereof; and
   processing means receiving the signals from said detection means to identify the status at each of said reserve locations and to register the presence or absence of an article at each of said reserved locations.

2. A manual free-access vending machine according to claim 1 wherein each of said locations comprises a receptacle having a shape which roughly corresponds to the outer shape of an individual article to be placed therein.

3. A manual free-access vending machine according to claim 2 wherein each receptacle includes a recess and said detection means comprises a set of ray emitting means and ray receiving means disposed on opposing side walls of the recess to emit and receive, respectively, infrared rays therebetween, the presence of an article in its corresponding location being detected when the rays from an emitting means is blocked from reaching the corresponding receiving means.

4. A manual free-access vending machine according to claim 3 in which said ray emitting means and said ray receiving means are placed behind the side walls, the rays from said ray emitting means to said receiving means passing through openings provided in the side walls of the recess in the receptacle.

5. A manual free-access vending machine according to claim 2 in which said support means includes means for removably supporting said support means so that a first support means can be replaced with another support means having locations corresponding to specific articles different from the ones on the first support means.

6. A manual free-access vending machine according to claim 5 in which said means for removably supporting said support means includes means for slidably supporting said support means in said housing.

7. A manual free-access vending machine according to claim 1 further including means for detecting environmental conditions in said housing and for generating signals representative thereof, and in which said processing means also receives signals from said environmental condition detecting means.

8. A manual free-access vending machine according to claim 1 in which said processing means comprises an energizing means, a sequential analyzing means, controlled by a clock means, for analyzing the detection means of the plurality of reserved locations for individual articles in sequence, information coding means receiving an output from said sequential analyzing means for coding information corresponding to the statuses of the locations, and a command means which initiates the sequential analysis of the statuses of the locations by said sequential analyzing means.

9. A manual free-access vending machine according to claim 8 in which said ray emitting means and electronic circuits connected thereto are energized only during time intervals of detection and analysis of the status at each of the locations by said sequential analyzing means.

10. A manual free-access vending machine according to claim 8 including a memory means and wherein said information coding means codes information corresponding to the status at each of the locations and stores the information within said memory means.

11. A manual free-access vending machine according to claim 8 including a display means and wherein said processing means transmits coded information to said display means.

12. A manual free-access vending machine according to claim 8 including printing means wherein said processing means transmits coded information to said printing means.

13. A manual free-access vending machine allowing unconstrained direct access to a plurality of different outer-shaped articles, said vending machine comprising:
a housing;
support means provided in said housing and defining fixed reserved locations from which corresponding individual articles can be removed and replaced, said support means including at each location a member providing a receptacle having a recess roughly corresponding to the outer shape of an individual article;
detection means disposed at each of said reserved locations to detect statuses corresponding to the presence or absence of each of the individual articles in said reserved locations and to generate signals representative thereof; and
processing means receiving the signals from said detection means to identify the status at each of the locations and to register the presence or absence of an article at each of said locations.

14. A manual free-access vending machine according to claim 13 in which said housing has a refrigerated interior space.

15. A manual free-access vending machine according to claim 14 further including temperature detecting means in the refrigerated space.

16. A manual free-access vending machine according to claim 13 including means indicating a door of the housing is open or closed.

17. A manual free-access vending machine according to claim 16 in which said door indicating means comprises a locking means for the door, and a set or ray emitting and ray receiving means for detecting the locked or unlocked condition of said locking means.

18. A manual free-access vending machine according to claim 13, said receptacles having projections keeping the articles away from the ray emitting means and ray receiving means to prevent damage thereto when the articles are removed or inserted in the receptacles.

19. A manual free-access vending machine allowing unconstrained direct access to a plurality of different outer-shaped articles, said vending machine comprising:
a housing;
support means provided in said housing and defining fixed reserved locations from which corresponding individual articles can be removed and replaced, said support means including at each location a member providing a receptacle having a recess roughly corresponding to the outer shape of a specific article;
detection means disposed at each of said reserved locations to detect statuses corresponding to the presence or absence of each of the individual articles in reserved locations and to generate signals representative thereof; and
processing means receiving the signals from said detection means to identify the status at each of the locations and to register the presence or absence of an article at each of said locations, said processing means including energizing means, sequential analyzing means, controlled by clock means, for analyzing detection means of the plurality of reserved locations for individual articles in sequence, information coding means receiving an output from said sequential analyzing means for coding information corresponding to the statuses of the locations, and a command mean which initiates the sequential analysis of the statuses of each of the locations by said sequential analyzing means.

20. A manual free-access vending machine allowing unconstrained direct access to a plurality of different outer-shaped articles, said vending machine comprising:
a housing;
support means provided in said housing and defining fixed reserved locations from which corresponding individual articles can be removed and replaced, said support means including at each location a member providing a receptacle having a recess roughly corresponding to the outer shape of a specific article;
detection means disposed at each of said reserved locations to detect statuses corresponding to the presence or absence of each of the individual articles in reserved locations and to generate signals representative thereof, said detection including two sets of ray emitting means and ray receiving means disposed at certain positions on opposing side walls of the recess so that the range of sizes of articles that can be placed in their corresponding locations can be extended; and
processing means receiving the signals from said detection means to identify the status at each of the locations and to register the presence or absence of an article at each of said locations.

21. A manual free-access vending machine allowing unconstrained direct access to a plurality of different outer-shaped articles, said vending machine comprising:

a housing having a refrigerated interior space;

temperature detecting means disposed in said refrigerated space and comprising a bimetallic element, a set of ray emitting and ray receiving means for detecting the state of the bimetallic element and thereby the temperature within the refrigerated space;

support means provided in said housing and defining fixed reserved locations from which corresponding individual articles can be removed and replaced, said support means including at each location a member providing a receptacle having a recess roughly corresponding to the outer shape of a specific article;

detection means disposed at each of said reserved locations to detect statuses corresponding to the presence or absence of each of the individual articles in reserved locations and to generate signals representative thereof, said detection including two sets of ray emitting means and ray receiving means disposed at certain positions on opposing side walls of the recess so that the range of sizes of articles that can be placed in their corresponding locations can be extended; and processing means receiving the signals from said detection means to identify the status at each of the locations and to register the presence or absence of an article at each of said locations.

* * * * *